United States Patent
Mizushima

(10) Patent No.: US 12,534,786 B2
(45) Date of Patent: Jan. 27, 2026

(54) ALLOY POWDER COMPOSITION, MOLDING AND THE MANUFACTURING METHOD THEREOF, AND INDUCTORS

(71) Applicant: CHILISIN ELECTRONICS CORP., Hsinchu (TW)

(72) Inventor: Takao Mizushima, Hsinchu (TW)

(73) Assignee: CHILISIN ELECTRONICS CORP., Hsinchu (TW)

( * ) Notice: Subject to any disclaimer, the term of this patent is extended or adjusted under 35 U.S.C. 154(b) by 220 days.

(21) Appl. No.: 16/450,529

(22) Filed: Jun. 24, 2019

(65) Prior Publication Data
US 2020/0343029 A1     Oct. 29, 2020

(30) Foreign Application Priority Data
Apr. 23, 2019   (TW) .................................. 108114085

(51) Int. Cl.
*C22C 38/34*         (2006.01)
*B22F 1/00*          (2022.01)
(Continued)

(52) U.S. Cl.
CPC ................ *C22C 38/34* (2013.01); *B22F 1/05* (2022.01); *B22F 1/08* (2022.01); *B22F 1/09* (2022.01);
(Continued)

(58) Field of Classification Search
CPC . H01F 1/53–5391; H01F 1/147–14791; H01F 1/153–15391
See application file for complete search history.

(56) References Cited

U.S. PATENT DOCUMENTS

| 7,132,019 B2 | 11/2006 | Koshiba et al. |
| 2004/0113744 A1 | 6/2004 | Watanabe et al. |

(Continued)

FOREIGN PATENT DOCUMENTS

| CN | 1689733 A | 11/2005 |
| CN | 104766684 A | 7/2015 |

(Continued)

OTHER PUBLICATIONS

China Patent Office, Office Action issued on Jun. 30, 2022 for CN application No. 201910582862.2.

(Continued)

*Primary Examiner* — Sally A Merkling
*Assistant Examiner* — Austin Pollock
(74) *Attorney, Agent, or Firm* — CKC & Partners Co., LLC

(57) ABSTRACT

The present application relates to an alloy powder composition, a method for manufacturing a molding from the alloy powder composition, a molding obtained from the method, and an inductor comprising the molding. The alloy powder composition comprises an Fe-based amorphous alloy powder and an Fe-based crystalline alloy powder; wherein the Fe-based amorphous alloy powder has a volume resistivity of equal to or less than $1\times10^6$ $\Omega\cdot$cm when subjected to a force of 20 kN and the Fe-based crystalline alloy powder has a volume resistivity of equal to or greater than $1\times10^6$ $\Omega\cdot$cm when subjected to a force of 20 kN; and wherein the Fe-based amorphous alloy powder comprises Fe, Co, Cr, C, P, and Si.

17 Claims, 5 Drawing Sheets

(51) Int. Cl.
*B22F 1/05* (2022.01)
*B22F 1/08* (2022.01)
*B22F 1/10* (2022.01)
*B22F 3/02* (2006.01)
*B22F 9/00* (2006.01)
*C22C 38/52* (2006.01)
*C22C 38/54* (2006.01)
*C22C 45/02* (2006.01)
*H01F 1/047* (2006.01)
*H01F 1/147* (2006.01)
*H01F 1/153* (2006.01)
*H01F 27/28* (2006.01)
*H01F 41/02* (2006.01)

(52) U.S. Cl.
CPC ............... *B22F 3/02* (2013.01); *C22C 38/52* (2013.01); *C22C 38/54* (2013.01); *C22C 45/02* (2013.01); *H01F 1/047* (2013.01); *H01F 1/147* (2013.01); *H01F 1/153* (2013.01); *H01F 27/28* (2013.01); *H01F 41/0246* (2013.01); *B22F 1/10* (2022.01); *B22F 9/002* (2013.01); *B22F 2301/35* (2013.01); *C22C 2200/02* (2013.01); *C22C 2202/02* (2013.01)

(56) References Cited

U.S. PATENT DOCUMENTS

| | | | |
|---|---|---|---|
| 2008/0142121 A1 | 6/2008 | Koshiba et al. | |
| 2011/0265915 A1* | 11/2011 | Tsuchiya | H01F 1/15375 148/306 |
| 2012/0092111 A1 | 4/2012 | Tsuchiya et al. | |
| 2012/0194309 A1* | 8/2012 | Nakamura | H01F 1/15375 335/297 |
| 2013/0300531 A1 | 11/2013 | Tsuchiya et al. | |
| 2014/0097922 A1 | 4/2014 | Tsuchiya et al. | |
| 2014/0138569 A1* | 5/2014 | Otsuka | H01F 1/26 252/62.51 R |
| 2016/0298216 A1 | 10/2016 | Kino et al. | |
| 2017/0025216 A1* | 1/2017 | Liao | B22F 7/08 |
| 2017/0309387 A1* | 10/2017 | Nakabayashi | H01F 1/153 |
| 2018/0021853 A1 | 1/2018 | Takadate et al. | |
| 2018/0108465 A1 | 4/2018 | Takahashi | |

FOREIGN PATENT DOCUMENTS

| | | | | |
|---|---|---|---|---|
| CN | 105304259 A | * | 2/2016 | ................ B22F 1/00 |
| CN | 107093514 A | | 8/2017 | |
| CN | 107142429 A | * | 9/2017 | ........... C22C 33/003 |
| JP | 2004197218 A | * | 7/2004 | |
| JP | 3771224 B2 | | 4/2006 | |
| JP | 2007-134381 A | | 5/2007 | |
| JP | 200954615 A | | 3/2009 | |
| JP | 5094276 B2 | | 12/2012 | |
| JP | 5112179 B2 | | 1/2013 | |
| JP | 5188760 B2 | | 4/2013 | |
| JP | 5419302 B2 | | 2/2014 | |
| JP | 5458452 B2 | | 4/2014 | |
| JP | 2016-145410 A | | 8/2016 | |
| JP | 2017108098 A | | 6/2017 | |
| JP | 2017208462 A | * | 11/2017 | ............ B22F 1/0059 |
| JP | 6260086 B2 | | 1/2018 | |
| KR | 2015140567 A | * | 12/2015 | ................ B22F 1/00 |
| TW | 200419600 A | | 10/2004 | |
| TW | 201712699 A | | 4/2017 | |
| TW | I579867 B | | 4/2017 | |
| TW | 201738908 A | | 11/2017 | |
| TW | I616541 B | | 3/2018 | |
| TW | I631223 B | | 8/2018 | |
| WO | WO-2018207521 A1 | * | 11/2018 | ................ B22F 1/00 |
| WO | WO-2019044698 A1 | * | 3/2019 | ............. H01F 1/153 |
| WO | WO-2020040250 A1 | * | 2/2020 | ............. B22F 1/052 |

OTHER PUBLICATIONS

Japan Patent Office, Office Action issued on Nov. 8, 2022 for JP application No. 2021-184044.

* cited by examiner

ALLOY POWDER COMPOSITION, MOLDING AND THE MANUFACTURING METHOD THEREOF, AND INDUCTORS

TECHNICAL FIELD

The present invention relates to an alloy powder composition, a method for manufacturing a molding from the alloy powder composition, a molding obtained from the method, and an inductor comprising the molding.

PRIOR ART

The inductor includes a core material and a conductor, wherein a ferrite core or a powder core may be used as the core material. Ferrite is a compound containing nickel, zinc or manganese, and has a higher relative permeability. In addition, the ferrite compound has low high-frequency iron losses and thus is widely used in high-frequency inductors. However, the ferrite has a disadvantage of poor saturation magnetic flux density. Moreover, the process for manufacturing of the nickel-zinc ferrite or manganese-zinc ferrite is complicated, which includes the steps of, for example, calcining, grinding, granulating, shaping, and sintering. In contrast, the powder core has high saturation magnetic flux density and can be pressed into any desired shapes. The volume of the inductor thus can be reduced to achieve miniaturization and weight reduction.

Patent Document 1 (TW200419600A) discloses a complex magnetic material obtained by mixing 60 wt % to 90 wt % of a ferrous crystalline alloy magnetic powder and 40 wt % to 10 wt % of a ferrous amorphous alloy magnetic powder. In addition, 1 wt % to 10 wt % of an insulating connecting agent is mixed into the mixed magnetic powders. However, in fact, there is still much room for improvement in conversion efficiency, permeability, and iron loss as shown in FIGS. 4 to 6 of Patent Document 1.

Patent Document 2 (TW201712699A) discloses a magnetic powder core material containing a carbonyl iron powder and an amorphous magnetic material. The mass ratio, i.e., a first mixing ratio, of the content of the carbonyl iron powder to the sum of the contents of the carbonyl iron powder and the amorphous magnetic material is from 75 mass % to 95 mass %. The iron loss $P_{CV}$ can easily be reduced by providing a magnetic powder core having not only the crystalline magnetic material powder but also the amorphous magnetic material powder. However, the permeability of the magnetic core obtained by such magnetic core material (FIG. 10 of Patent Document 2) is insufficient and there is also room for improvement in the reduction of iron loss. Moreover, the inductance conversion efficiency thus obtained is not good.

CONTENT OF THE INVENTION

Therefore, it is an object of the present invention to provide an alloy powder composition with stable high permeability and low core loss, a method for manufacturing a molding from the alloy powder composition and a molding obtained from the method, as well as an inductor with high inductance conversion efficiency.

The term "permeability" referred to in the context of the present invention is the real part of the relative permeability. The relative permeability is the value of the actual permeability divided by the permeability of free space. The real part of the relative permeability (μr') is in proportion to inductance. Moreover, according to the relation of $L \propto \mu r' \times N^2$, under the same inductance, if a material with larger permeability is used, the number of coils may be reduced and a thicker wire diameter may be used for reducing the DC resistance. Electromagnetic conversion efficiency can be classified into two categories: light-load efficiency and heavy-load efficiency. The light-load efficiency depends on the iron loss of the magnetic materials. The lower the iron loss is, the higher the light-load efficiency can be increased. Heavy-load efficiency depends on the resistance value of the conductor. The conductor with low resistance can improve the electromagnetic conversion efficiency at heavy loads. Therefore, a magnetic material with a high μr' and low iron loss can improve the electromagnetic conversion efficiency from light loads to heavy loads.

In order to achieve the object of the present invention, the inventor found that by using the alloy powder composition of the present invention, high permeability, low iron loss, and high conversion efficiency can be achieved. In particular, the alloy powder composition of the present invention can exhibit excellent soft magnetic properties even at high frequencies.

Therefore, one aspect of the present invention is an alloy powder composition comprising an Fe-based amorphous alloy powder and an Fe-based crystalline alloy powder; wherein the Fe-based amorphous alloy powder has a volume resistivity of equal to or less than $1 \times 10^6$ Ω·cm when subjected to a force of 20 kN and the Fe-based crystalline alloy powder has a volume resistivity of equal to or greater than $1 \times 10^6$ Ω·cm when subjected to a force of 20 kN; and wherein the Fe-based amorphous alloy comprises Fe, Co, Cr, C, P, and Si, and may optionally comprises one or more of Ni, B, and Al.

Another aspect of the present invention is a method for manufacturing a molding comprising mixing the alloy powder composition according to the present invention and a binder to form a molding material, and pressure molding the molding material to form a molding.

Another aspect of the present invention is a molding obtained from the method for manufacturing a molding according to the present invention, wherein the molding has a volume resistivity of equal to or greater than $1 \lambda 10^4$ Ω·cm and a relative molding density of 70% to 95%.

Another aspect of the present invention is an inductor comprising the molding according to the present invention.

The molding according to the present invention has stable high permeability and significantly reduced iron loss compared to the prior art, and the inductor comprising the molding of the present invention has high inductance conversion efficiency.

MODE FOR CARRYING OUT THE INVENTION

Figure 1:
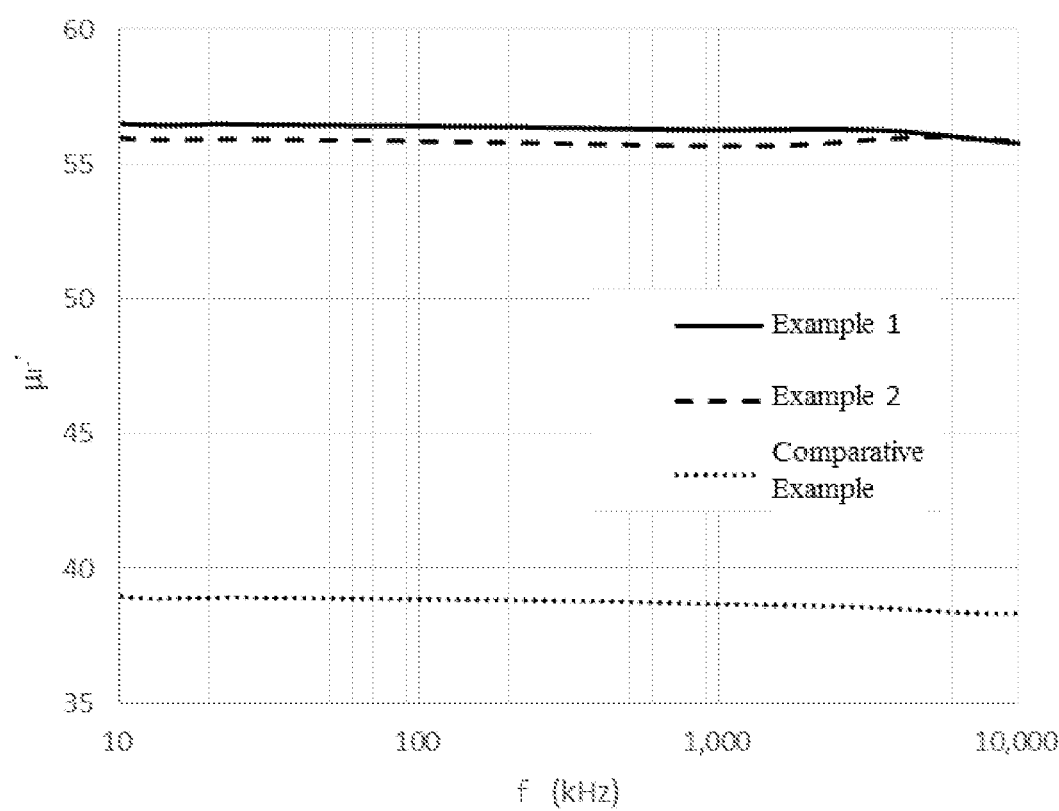
FIG. 1 shows the relationship between permeability and frequency of the inventive Examples 1-2 and Comparative Example.

The alloy powder composition of the present invention comprises an Fe-based amorphous alloy powder and an Fe-based crystalline alloy powder; wherein the Fe-based amorphous alloy powder has a volume resistivity of equal to or less than $1\times10^6$ Ω·cm when subjected to a force of 20 kN and the Fe-based crystalline alloy powder has a volume resistivity of equal to or greater than $1\times10^6$ Ω·cm when subjected to a force of 20 kN; and wherein the Fe-based amorphous alloy powder comprises Fe, Co, Cr, C, P, and Si, and optionally one or more of Ni, B, and Al. According to the alloy powder composition of the present invention, the volume resistivity of the Fe-based amorphous alloy powder and the Fe-based crystalline alloy powder is determined in accordance with JIS K6911 in combination with, for example, the powder resistivity measuring system, MCP-PD51, and is the value measured under a force of 20 kN.

The Fe-based amorphous alloy of the present invention comprises Fe, Co, Cr, C, P, and Si.

In one embodiment of the present invention, the Fe-based amorphous alloy may additionally comprise one or more of Ni, B, and Al.

In one embodiment of the present invention, the Fe-based amorphous alloy comprises or consists of Fe, Co, Cr, C, P, and Si.

In one embodiment of the present invention, the Fe-based amorphous alloy comprises or consists of Fe, Co, Cr, C, P, B, and Si.

In one embodiment of the present invention, the Fe-based amorphous alloy comprises or consists of Fe, Co, Cr, C, P, Al, and Si.

In one embodiment of the present invention, the Fe-based amorphous alloy comprises or consists of Fe, Co, Ni, P, Cr, C, and Si.

In one embodiment of the present invention, the Fe-based amorphous alloy comprises or consists of Fe, Co, Ni, P, Cr, C, B, and Si.

In one embodiment of the present invention, the Fe-based amorphous alloy comprises or consists of Fe, Co, Ni, P, Cr, C, Al, and Si.

In one embodiment of the present invention, the Fe-based amorphous alloy may comprise the following atomic ratios:

70 at %<Fe<83 at %;
0 at %<Co<1 at %;
1 at %<Cr<4 at %;
7 at %<C<11 at %;
9 at %<P<12 at %;
0 at %<Si<1 at %;
Ni being absent or 5 at %<Ni<7 at %;
0 at % B<3 at %; and
0 at %≤Al<1 at %.

In one embodiment of the present invention, the amount of Fe in the Fe-based amorphous alloy is, for example, in the range of >70 at % to <83 at %, or in the range of >70 at % to <81 at %, or in the range of >70 at % to <79 at %, or in the range of >70 at % to <78 at %.

In one embodiment of the present invention, the oxygen content of the Fe-based amorphous alloy is equal to or less than 2500 ppm, or equal to or less than 2300 ppm, or equal to or less than 2000 ppm.

In one embodiment of the present invention, the median diameter $D_{50}$ of the Fe-based amorphous alloy powder is from 4 μm to 14 μm, or from 5 μm to 12 μm, determined in accordance with laser diffraction method.

The examples of the Fe-based crystalline alloy of the present invention comprise Fe—Ni based alloy, Fe—Co based alloy, Fe—V based alloy, Fe—Si—Cr based alloy, Fe—Al based alloy, Fe—Si based alloy, and Fe—Si—Al based alloy. These alloys can be used alone or as a mixture thereof. In the present invention, the Fe—Si—Cr based alloy is preferably used.

In one embodiment of the present invention, the Fe-based crystalline alloy powder has a median diameter $D_{50}$ of from 1 μm to 15 μm, from 2 μm to 10 μm, or from 2.5 μm to 6 μm, determined in accordance with laser diffraction method.

In one embodiment of the present invention, the Fe-based crystalline alloy is Fe—Si—Cr based alloy.

In one preferred embodiment of the present invention, the Fe-based crystalline alloy is Fe—Si—Cr based alloy, wherein the Cr concentration thereof is equal to or greater than 4 wt %.

In one embodiment of the present invention, the Fe-based amorphous alloy powder has a tap density of ≥3.5 g/cm³ and the Fe-based crystalline alloy powder has a tap density of ≥2 g/cm³. The tap density is determined in accordance with, for example, ISO 3953, wherein the tap density is the packing density when the powder in a cylinder has been tapped for defined times and the volume of the powder is no longer changed. The Fe-based amorphous alloy powder has a BET specific surface area of from 0.15 m²/g to 0.30 m²/g and the Fe-based crystalline alloy powder has a BET specific surface area of 0.5 m²/g to 2.5 m²/g, wherein the BET specific surface area is determined according to, for example, ISO 9277.

According to the alloy powder composition of the present invention, the mixing ratio of the Fe-based amorphous alloy powder and the Fe-based crystalline alloy powder is in the range of from 20:80 to 95:5, from 30:70 to 95:5, from 40:60 to 95:5, from 50:50 to 95:5, from 60:40 to 95:5, from 70:30 to 95:5, from 80:20 to 95:5, or from 90:10 to 95:5, by weight. In a preferred embodiment of the present invention, the mixing ratio of the Fe-based amorphous alloy powder and the Fe-based crystalline alloy powder is 90:10 by weight.

The Fe-based amorphous alloy powder of the present invention may be produced, for example, by atomization. The atomization process breaks the alloy liquid into fine droplets by impact with a rapidly moving fluid (atomizing medium) or other means and then the droplets are cooled to form solid powders.

Another aspect of the present invention is a method for manufacturing a molding comprising mixing the alloy powder composition according to the present invention and a binder to form a molding material, and pressure molding the molding material to obtain a molding. The molding pressure is not limited. According to the Shin Tajima el at., Properties of High-Density Magnetic Composite (HDMC) by Warm Compaction Using Die Wall Lubrication, J. Jpn. Soc. Powder Metallurgy Vol. 50, No. 7, as the molding pressure increases, the volume resistivity decreases. Those skilled in the art can adjust the molding pressure according to the ratio of the Fe-based amorphous alloy powder added and the mechanical strength of the resulted molding to obtain a molding having a volume resistivity of $1\times10^4$ Ω·cm or more. During the pressure molding process, heat can optionally be applied. Examples of the binder used in the present invention are epoxy resin, polysiloxane resin, acrylic resin, phenolic resin, or polyvinyl alcohol. The amount of the binder used in the method of the present invention is from 1 wt % to 4 wt %, or from 1 wt % to 3 wt %, or from 2 wt % to 3 wt %, based on the total weight of the alloy powder composition and the binder.

Another aspect of the present invention is a molding comprising the alloy powder composition according to the present invention, wherein the molding has a volume resistivity of $1 \times 10^4$ Ω·cm or more and a relative molding density of 70% to 95%.

The molding of the present invention has a relative molding density of from 70% to 95%, or a relative molding density of from 75 to 92%, or a relative molding density of from 80% to 90%. The relative molding density is defined as the following formula:

$$\text{Relative Molding Density (\%)} = \frac{\text{the density of the pressure-molded molding}}{\text{the true density of the alloy powder composition before molding}} \times 100.$$

The shape of the molding of the present invention is not limited and may be, for example, an E-shape, a T-shape, or a drum-shape.

Another aspect of the present invention is an inductor comprising the molding according to the present invention and a conductor, such as a conducting wire with an insulating layer or bus bar. The inductor of the present invention may be, for example, a wire wound inductor or a molded inductor.

In one embodiment of the present invention, the inductor is a wire wound inductor, and the conducting wire with an insulating layer is wound around the molding. The wire wound inductor of the present invention is obtained by winding a conducting wire with an insulating layer on the molding of the present invention and sealing the molding by covering with a magnetic sealant from outside.

In one embodiment of the present invention, the inductor is a molded inductor, and the conductor is embedded inside the molding. The method for manufacturing the molded inductor is disclosed in U.S. Pat. Nos. 6,204,474 B1 and 6,1983,075 B1. The inductor of the present invention is manufactured, for example, by the following method: welding one end of the conductor to a lead frame; winding the conductor; welding the other end of the conductor to the lead frame; placing the conductor into a die; mixing the mixture of the alloy powder composition of the present invention and the binder to form a molding material; pouring the molding material into the die; pressuring molding; heating to cure the binder. Examples of the binder used in the present invention are epoxy resin, polysiloxane resin, acrylic resin, phenolic resin, or polyvinyl alcohol. Fillers and/or lubricants can be optionally added to the molding material. In the pressure molding step, appropriate pressure is applied to the molding material to compress the molding material around the conductor.

EXAMPLES

Example 1

The Fe-based amorphous alloy powder and the Fe-based crystalline alloy powder with the properties shown in Table 1 were used. After mixing 90 wt % of $Fe_{77.27}Co_{0.1}P_{10.8}C_{9.31}Cr_2Si_{0.52}$ powder and 10 wt % of $Fe_{88.6}Cr_{6.7}Si_{4.7}$ powder, an acrylic resin was added as a binder to form a molding material. The molding material was then pressure molded under a molding pressure of 20 t/cm² to form a molding having a volume resistivity of greater than $10^4$ Ω·cm and a relative molding density of 82%. The oxygen content of the $Fe_{77.27}Co_{0.1}P_{10.8}C_{9.31}Cr_2Si_{0.52}$ powder is 1300~1400 ppm, and the Cr concentration of the $Fe_{88.6}Cr_{6.7}Si_{4.7}$ powder is 4.5 wt %. The amount of the acrylic resin binder used was 2 wt % based on the total weight of the alloy powder composition and the binder.

TABLE 1

The properties of the Fe-based amorphous alloy and the Fe-based crystalline alloy used in Example 1

|  | Volume resistivity Ω·cm when subjected to a force of 20 kN | Tap density g/cm³ | Specific surface area m²/g |
| --- | --- | --- | --- |
| Fe-based amorphous alloy $Fe_{77.27}Co_{0.1}P_{10.8}C_{9.31}Cr_2Si_{0.52}$ | $0.8 \times 10^3$ | 4.38 | 0.21 |
| Fe-based crystalline alloy $Fe_{88.6}Cr_{6.7}Si_{4.7}$ | $4.5 \times 10^8$ | 3.3 | 1.76 |

Example 2

The Fe-based amorphous alloy powder and the Fe-based crystalline alloy powder with the properties shown in Table 2 were used. After mixing 90 wt % of $Fe_{70.97}Co_{0.1}Ni_{5.96}Cr_{1.99}P_{10.74}C_{7.75}B_{1.99}Si_{0.5}$ powder and 10 wt % of $Fe_{88.6}Cr_{6.7}Si_{4.7}$ powder, an acrylic resin was added as a binder to form a molding material. The molding material was pressure molded under a molding pressure of 20 t/cm² to form a molding having a volume resistivity of greater than $10^4$ Ω·cm and a relative molding density of 82%. The oxygen content of the $Fe_{70.97}Co_{0.1}Ni_{5.96}Cr_{1.99}P_{10.74}C_{7.75}B_{1.99}Si_{0.5}$ powder is 1300~1400 ppm, and the Cr concentration of the $Fe_{88.6}Cr_{6.7}Si_{4.7}$ powder is 4.5 wt %. The amount of the acrylic resin binder used was 2 wt % based on the total weight of the alloy powder composition and the binder.

TABLE 2

The properties of the Fe-based amorphous alloy and the Fe-based crystalline alloy used in Example 2

|  | Volume resistivity Ω·cm when subjected to a force of 20 kN | Tap density g/cm³ | Specific surface area m²/g |
| --- | --- | --- | --- |
| Fe-based amorphous alloy $Fe_{70.97}Co_{0.1}Ni_{5.96}Cr_{1.99}P_{10.74}C_{7.75}B_{1.99}Si_{0.5}$ | $0.8 \times 10^3$ | 4.38 | 0.21 |
| Fe-based crystalline alloy $Fe_{88.6}Cr_{6.7}Si_{4.7}$ | $4.5 \times 10^8$ | 3.3 | 1.76 |

Comparative Example

The Fe-based amorphous alloy powder and the Fe-based crystalline alloy powder with the properties shown in Table 3 were used. After mixing 30 wt % of $Fe_{73}Si_{11}B_{10.8}Cr_{2.3}C_{2.9}$ powder and 70 wt % of carbonyl iron powder (CIP), an epoxy resin was added as a binder to form a molding material. The molding material was then pressure molded under a molding pressure of 20 t/cm² to form a molding having a volume resistivity of greater than $10^4$ Ω·cm and a relative molding density of 87%. The amount of the epoxy resin binder used was 4.5 wt % based on the total weight of the alloy powder composition and the binder. It should be noted that in Comparative Example, in order to obtain the molding having a volume resistivity of greater than $10^4$ Ω·cm, it is required to add a higher amount of the binder, resulting in poor soft magnetic properties.

TABLE 3

The properties of the Fe-based amorphous alloy and the Fe-based crystalline alloy used in Comparative Example

| | Volume resistivity Ω · cm when subjected to a force of 20 kN | Tap density g/cm³ | Specific surface area m²/g |
|---|---|---|---|
| Fe-based amorphous alloy $Fe_{73}Si_{11}B_{10.8}Cr_{2.3}C_{2.9}$ | $0.8 \times 10^3$ | 4.1 | 1.1 |
| Fe-based crystalline alloy Carbonyl iron powder | 6.5 | 4.7 | 0.77 |

The permeability µr' and iron loss $P_{CV}$ of the moldings obtained according to Examples 1-2 and Comparative Example were measured, and the results are shown in FIG. 1 and FIGS. 2-4.

Figure 2:
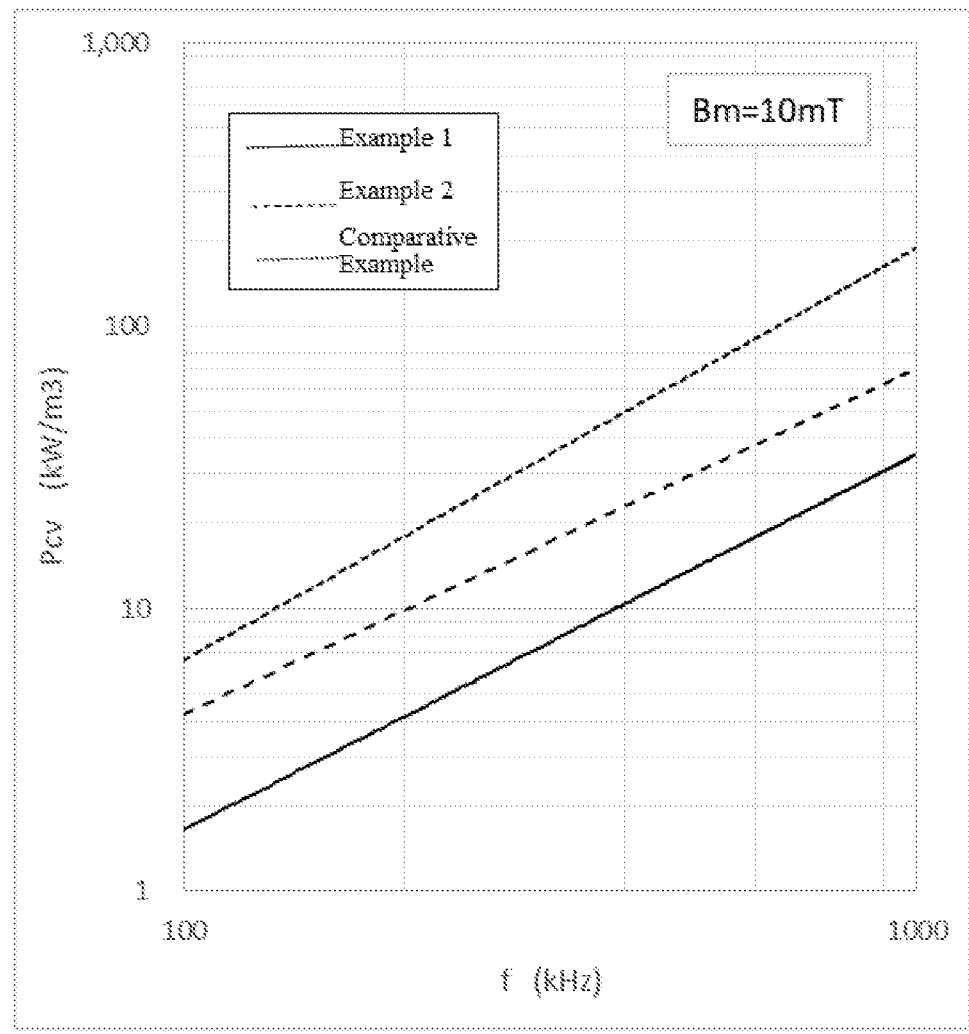
FIG. 2 shows the relationship between iron loss and frequency of the inventive Examples 1-2 and Comparative Example at $B_m=10$ mT.
Figure 3:
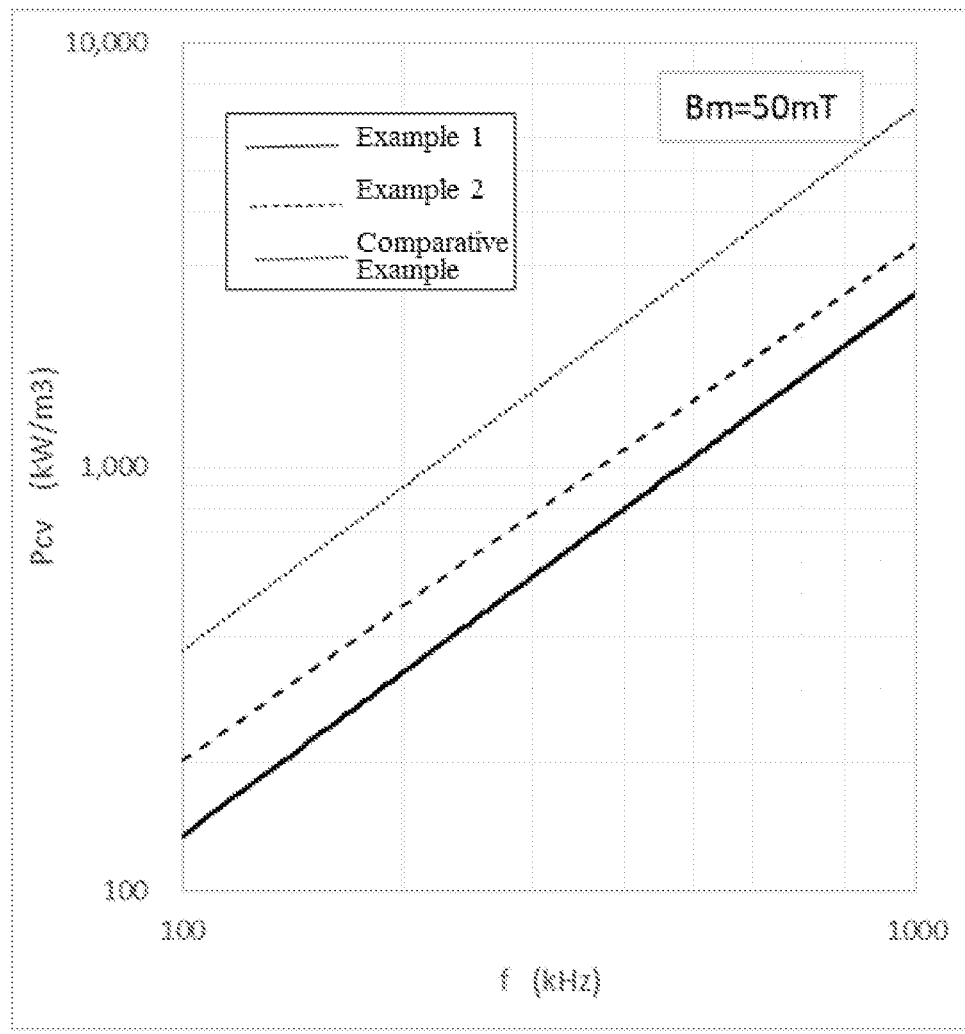
FIG. 3 shows the relationship between iron loss and frequency of the inventive Examples 1-2 and Comparative Example at $B_m=50$ mT.
Figure 4:
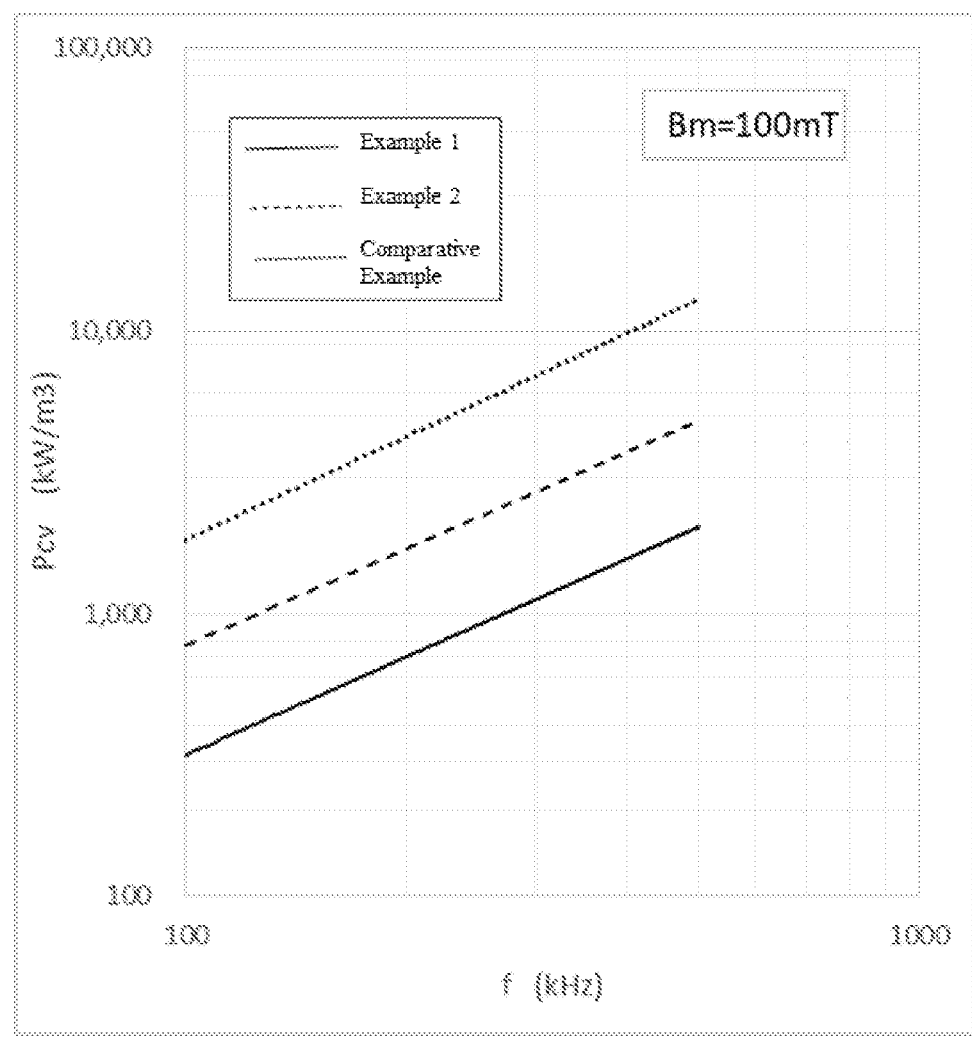
FIG. 4 shows the relationship between iron loss and frequency of the inventive Examples 1-2 and Comparative Example at $B_m=100$ mT.

FIG. 1 shows the relationship between permeability and frequency. The permeability µr' shown in FIG. 1 is the real part of relative permeability, which is the real part of relative permeability measured by using a magnetic ring with an outer diameter of 13.5 mm, an inner diameter of 7.6 mm, and a height of 5 mm made of the molding materials of Examples 1-2 and Comparative Example, respectively. It can be seen from FIG. 1 that the permeability of the moldings of Examples 1-2 is much higher than that of Comparative Example, and the moldings have stable permeability even in the high-frequency region. FIGS. 2-4 exhibit the relationship between iron loss and frequency under different maximum magnetic flux densities ($B_m$=10, 50, and 100 mT). The moldings of Examples 1-2 both have a significantly lower iron loss.

Figure 5:
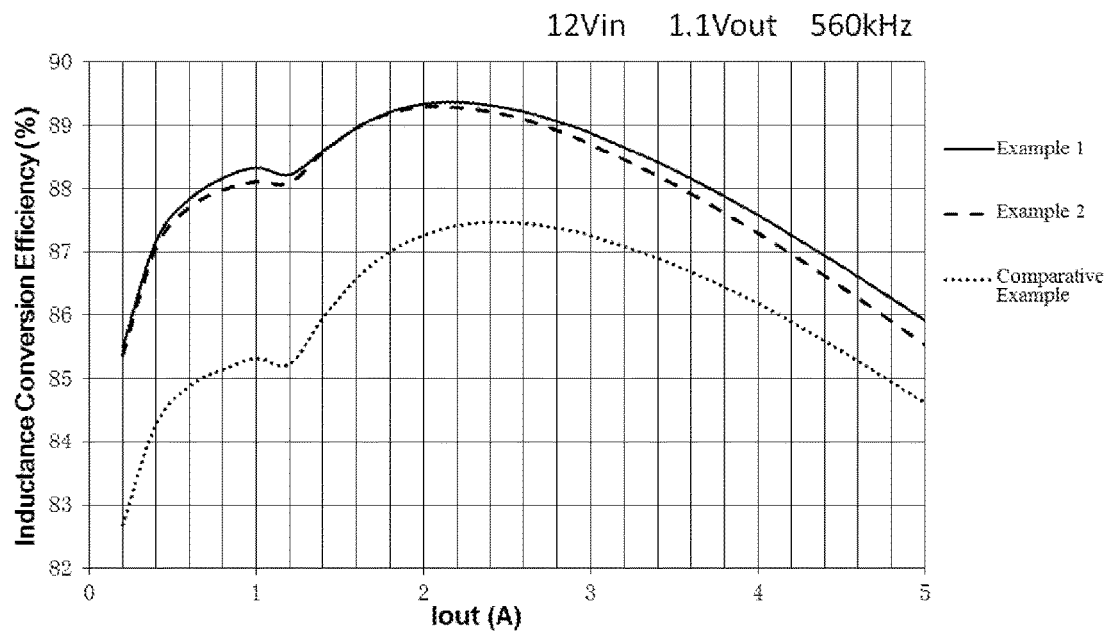
FIG. 5 shows the inductance conversion efficiency of the inventive Examples 1-2 and Comparative Example.

The inductance conversion efficiency was further analyzed and the results are shown in FIG. 5. As can be seen from FIG. 5, the conversion efficiency of the inductors obtained from the moldings of Examples 1-2 is remarkably superior to that of Comparative Example.

Although the preferred embodiments of the present invention have been described in detail above with reference to the drawings, the invention is not limited to the embodiments described above. A person having ordinary skill in the art can make various changes within the scope of the claims and can also arbitrarily combine various embodiments disclosed in the specification, and it is obvious that these also belong to the technical scope of the present invention.

The invention claimed is:

1. Alloy powder composition comprising an Fe-based amorphous alloy powder and an Fe-based crystalline alloy powder, wherein the Fe-based amorphous alloy powder has a volume resistivity of $1 \times 10^6$ Ω·cm or less when subjected to a force of 20 kN, and the Fe-based crystalline alloy powder has a volume resistivity of $1 \times 10^6$ Ω·cm or more when subjected to a force of 20 kN; and wherein the Fe-based amorphous alloy comprises Fe, Co, Cr, C, P, and Si, and optionally one or more of Ni, B, and Al, wherein the Fe-based amorphous alloy powder comprises the following atomic ratios:
70 at %<Fe<83 at %;
0.1 at %<Co<1 at %;
1 at %<Cr<4 at %;
7 at %<C<11 at %;
9 at %<P<12 at %;
0 at %<Si<1 at %;
Ni being absent or 5 at %<Ni<7 at %;
0 at %≤B<3 at %; and
0 at %≤Al<1 at %,
wherein an oxygen content of the Fe-based amorphous alloy powder is in a range from 1300 ppm to 2500 ppm,
wherein the Fe-based amorphous alloy powder has a tap density of ≥3.5 g/cm³.

2. The alloy powder composition of claim 1, wherein the Fe-based amorphous alloy powder comprises the atomic ratio of 70 at %<Fe<78 at %.

3. The alloy powder composition of claim 1, wherein the Fe-based crystalline alloy powder has a tap density of ≥2 g/cm³.

4. The alloy powder composition of claim 1, wherein the Fe-based amorphous alloy powder has a BET specific surface area of from 0.15 m²/g to 0.30 m²/g, and the Fe-based crystalline alloy powder has a BET specific surface area of from 0.5 m²/g to 2.5 m²/g.

5. The alloy powder composition of claim 1, wherein the Fe-based amorphous alloy powder has a median diameter $D_{50}$ of from 4 µm to 14 µm.

6. The alloy powder composition of claim 1, wherein the mixing ratio of the Fe-based amorphous alloy powder and the Fe-based crystalline alloy powder is in the range of from 20:80 to 95:5 by weight.

7. The alloy powder composition of claim 1, wherein the Fe-based crystalline alloy powder is selected from one or more of the group consisting of Fe—Ni based alloy, Fe—Co based alloy, Fe—V based alloy, Fe—Si—Cr based alloy, Fe—Al based alloy, Fe—Si based alloy, and Fe—Si—Al based alloy, and the Fe-based crystalline alloy powder has a median diameter $D_{50}$ of from 2.5 µm to 6 µm.

8. The alloy powder composition of claim 7, wherein the Fe-based crystalline alloy powder is Fe—Si—Cr based alloy.

9. The alloy powder composition of claim 8, wherein the Cr content of the Fe—Si—Cr based alloy is equal to or greater than 4 wt %.

10. Method for manufacturing a molding, comprising mixing the alloy powder composition according to claim 1 and a binder to form a molding material, and pressure molding the molding material.

11. The method of claim 10, wherein the binder is epoxy resin, polysiloxane resin, acrylic resin, phenolic resin, or polyvinyl alcohol.

12. The method of claim 10, wherein the binder is used in an amount of from 1 wt % to 4 wt %, based on the total weight of the alloy powder composition and the binder.

13. Molding obtained by the method according to claim 10, wherein the molding has a volume resistivity of equal to or greater than $1 \times 10^4$ Ω·cm and a relative molding density of 70% to 95%.

14. Inductor comprising the molding of claim 13.

15. The inductor of claim 14, comprising a conductor, wherein the conductor is embedded inside the molding or wound around the molding on the outside.

16. A molding made of a pressed molding material, wherein the pressed molding material includes an alloy powder composition and a binder, and the alloy powder composition includes:
an Fe-based crystalline alloy powder, wherein the Fe-based crystalline alloy powder is a Fe—Si—Cr based alloy; and
an Fe-based amorphous alloy powder including the following atomic ratios:
70 at %<Fe<83 at %;
0.1 at %<Co<1 at %;
1 at %<Cr<4 at %;
7 at %<C<11 at %;
9 at %<P<12 at %;
0 at %<Si<1 at %;
Ni being absent or 5 at %<Ni<7 at %;
0 at %≤B<3 at %; and
0 at %≤Al<1 at %,
wherein an oxygen content of the Fe-based amorphous alloy powder is in a range from 1300 ppm to 2500 ppm,
wherein the Fe-based amorphous alloy powder has a tap density of ≥3.5 g/cm³.

17. Alloy powder composition comprising an Fe-based amorphous alloy powder and an Fe-based crystalline alloy powder, wherein the Fe-based amorphous alloy powder has a volume resistivity of 1×10⁶ Ω·cm or less when subjected to a force of 20 kN, and the Fe-based crystalline alloy powder has a volume resistivity of 1×10⁶ Ω·cm or more when subjected to a force of 20 kN; and wherein the Fe-based amorphous alloy comprises Fe, Co, Cr, C, P, and Si, and optionally one or more of Ni, B, and Al, wherein the Fe-based amorphous alloy powder consisting of the following atomic ratios:
70 at %<Fe<83 at %;
0.1 at %<Co<1 at %;
1 at %<Cr<4 at %;
7 at %<C<11 at %;
9 at %<P<12 at %;
0 at %<Si<1 at %;
Ni being absent or 5 at %<Ni<7 at %;
0 at %≤B<3 at %; and
0 at %≤Al<1 at %,
wherein an oxygen content of the Fe-based amorphous alloy powder is in a range from 1300 ppm to 2500 ppm,
wherein the Fe-based amorphous alloy powder has a tap density of ≥3.5 g/cm³.

* * * * *